United States Patent
Kruckemyer et al.

(10) Patent No.: US 7,366,847 B2
(45) Date of Patent: Apr. 29, 2008

(54) DISTRIBUTED CACHE COHERENCE AT SCALABLE REQUESTOR FILTER PIPES THAT ACCUMULATE INVALIDATION ACKNOWLEDGEMENTS FROM OTHER REQUESTOR FILTER PIPES USING ORDERING MESSAGES FROM CENTRAL SNOOP TAG

(75) Inventors: David A. Kruckemyer, Vancouver (CA); Kevin B. Normoyle, Santa Clara, CA (US); Robert G. Hathaway, Sunnyvale, CA (US)

(73) Assignee: Azul Systems, Inc., Mountain View, CA (US)

( * ) Notice: Subject to any disclaimer, the term of this patent is extended or adjusted under 35 U.S.C. 154(b) by 271 days.

(21) Appl. No.: 11/307,413

(22) Filed: Feb. 6, 2006

(65) Prior Publication Data
US 2007/0186054 A1    Aug. 9, 2007

(51) Int. Cl.
G06F 12/00    (2006.01)
(52) U.S. Cl. ............................... 711/144; 711/141
(58) Field of Classification Search ............ None
See application file for complete search history.

(56) References Cited

U.S. PATENT DOCUMENTS

| | | | |
|---|---|---|---|
| 4,463,420 A | 7/1984 | Fletcher | 711/133 |
| 5,623,628 A | 4/1997 | Brayton et al. | 711/141 |
| 5,778,434 A | 7/1998 | Nguyen et al. | 711/137 |
| 6,173,370 B1 | 1/2001 | Tanioka | 711/143 |
| 6,321,305 B1 | 11/2001 | Arimilli et al. | 711/143 |
| 6,347,361 B1 | 2/2002 | Arimilli et al. | 711/141 |
| 6,463,507 B1 | 10/2002 | Arimilli et al. | 711/122 |
| 6,502,171 B1 | 12/2002 | Arimilli et al. | 711/146 |
| 6,636,949 B2 | 10/2003 | Barroso et al. | 711/141 |
| 6,654,858 B1 | 11/2003 | Asher et al. | 711/144 |
| 6,701,416 B1 | 3/2004 | Arimilli et al. | 711/141 |
| 2003/0120877 A1 | 6/2003 | Jahnke | 711/150 |
| 2004/0003184 A1 | 1/2004 | Safranek et al. | 711/146 |

*Primary Examiner*—Hong Kim
*Assistant Examiner*—Ngoc Dinh
(74) *Attorney, Agent, or Firm*—g Patent LLC; Stuart T. Auvinen

(57) ABSTRACT

A multi-processor, multi-cache system has filter pipes that store entries for request messages sent to a central coherency controller. The central coherency controller orders requests from filter pipes using coherency rules but does not track completion of invalidations. The central coherency controller reads snoop tags to identify sharing caches having a copy of a requested cache line. The central coherency controller sends an ordering message to the requesting filter pipe. The ordering message has an invalidate count indicating the number of sharing caches. Each sharing cache receives an invalidation message from the central coherency controller, invalidates its copy of the cache line, and sends an invalidation acknowledgement message to the requesting filter pipe. The requesting filter pipe decrements the invalidate count until all sharing caches have acknowledged invalidation. All ordering, data, and invalidation acknowledgement messages must be received by the requesting filter pipe before loading the data into its cache.

20 Claims, 13 Drawing Sheets

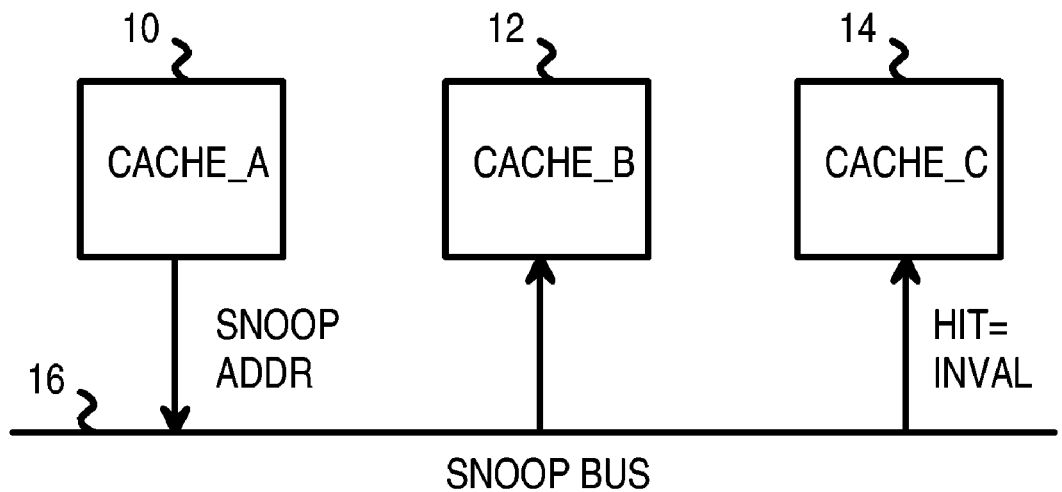
PRIOR ART    FIG. 1
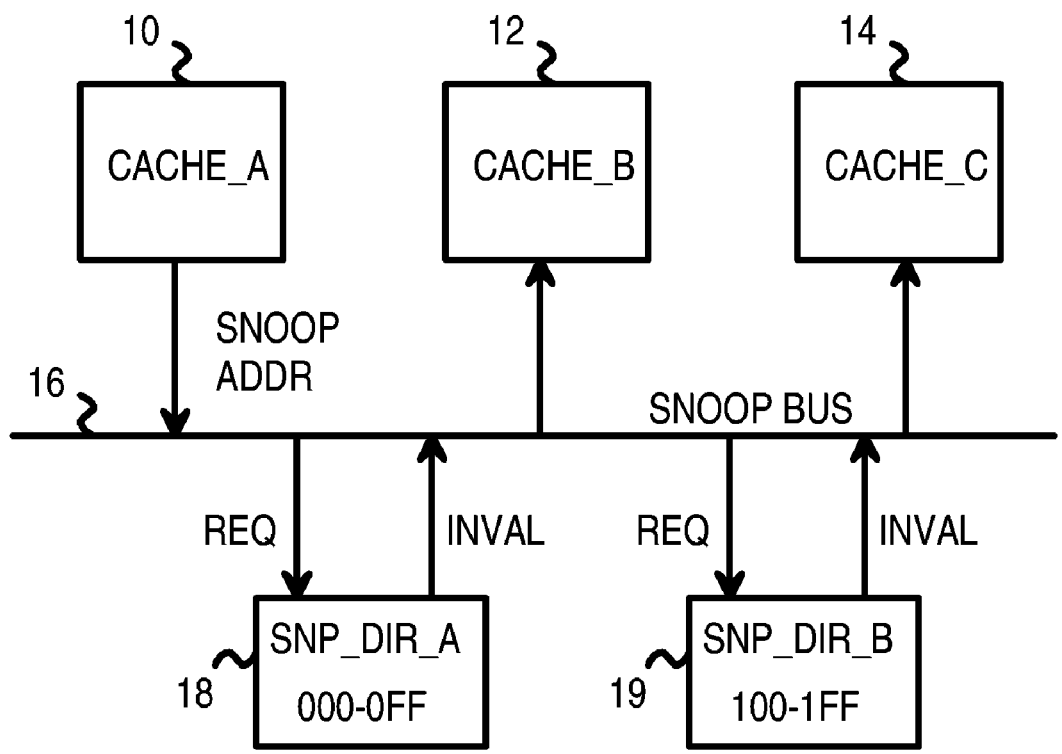
PRIOR ART    FIG. 2

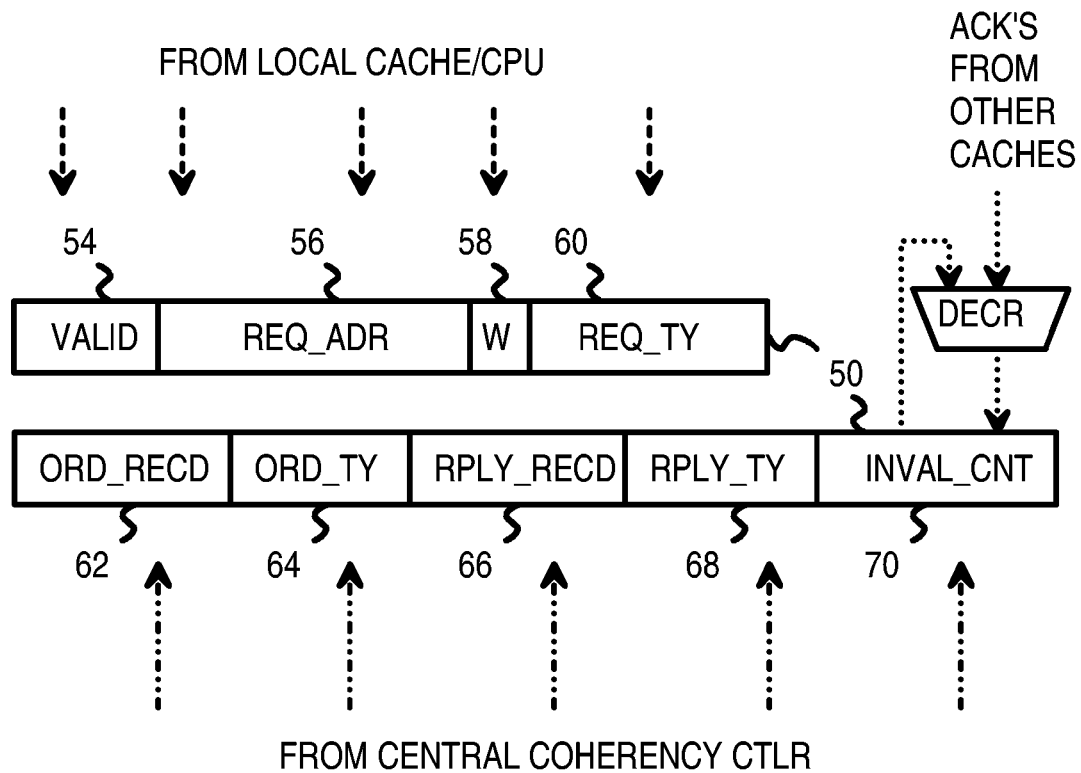

DISTRIBUTED CACHE COHERENCE AT SCALABLE REQUESTOR FILTER PIPES THAT ACCUMULATE INVALIDATION ACKNOWLEDGEMENTS FROM OTHER REQUESTOR FILTER PIPES USING ORDERING MESSAGES FROM CENTRAL SNOOP TAG

RELATED APPLICATION

This application is related to the application for "Duplicate Snoop Tags Partitioned Across Multiple Processor/Cache Chips in a Multi-Processor System", U.S. Ser. No. 10/711,387, now U.S. Pat. No. 7,225,300 filed Sep. 15, 2004.

FIELD OF THE INVENTION

This invention relates to multi-processor systems, and more particularly to distributed cache coherency.

BACKGROUND OF THE INVENTION

Systems with multiple processors typically must share resources, especially memory. A main memory may be shared among several processors by transferring portions of the main memory to caches near the processors. However, sometimes more than one processor may request the same line in main memory. Keeping the shared memory line coherent may require tracking which processor caches have a copy of the cache line at any time. As the line is written to, other copies of the old line must be updated or invalidated.

FIG. 1 shows three caches using a snoop bus for coherency. Snoop bus 16 connects to caches 10, 12, 14 that can cache data for three processors. When cache 10 has a read miss, new data is read from a shared main memory (not shown) and loaded into cache 10. The address of the new data is sent by cache 10 onto snoop bus 16 as the snoop address. Other caches 12, 14 examine the snoop address on snoop bus 16 to determine if any lines in caches 12, 14 are for the same address. Cache 12 has no matching cache lines and does no further processing. However cache 14 has a cache line that matches the snoop address. Cache 14 invalidates its cache line matching the snoop address so that cache 10 has the only cached copy of the cache line.

While such a snoop bus has been useful in the prior art, scalability is a problem. When the number of caches connected to snoop bus 16 increases to 8, 16, 32, 64, or more, snoop bus 16 gets overloaded with snoop addresses sent by the many caches.

FIG. 2 shows a distributed snoop directory. Rather than have each cache monitor snoop bus 16 and compare each snoop address to its own cache tags, snoop requests are sent over snoop bus 16 to a central directory of snoop tags. Snoop tag directory 18 receives snoop requests from caches 10, 12, 14 when cache misses occur. Snoop requests are sent from caches 10, 12, 14 over snoop bus 16 to snoop tag directory 18. Snoop tag directory 18 has a duplicate set of cache tags that indicate which of caches 10, 12, 14 has a copy of the range of memory addresses stored in the corresponding cache line.

When another cache has a copy of a requested cache line, an invalidate command may be sent from snoop tag directory 18 to the other cache having the copy of the cache line. The other cache invalidates the cache line to maintain coherency.

For example, cache 10 has a cache miss and sends a request to snoop tag directory 18 with snoop address A. Snoop tag directory 18 looks up snoop address A in its set of snoop tags and finds that cache 14 has a copy of this same cache line. Snoop tag directory 18 sends an invalidate command over snoop bus 16 to cache 14, which invalidates the cache line. Then cache 10 can safely load the cache line and have the only valid cached copy of that line.

Rather than have a single snoop tag directory 18, multiple snoop tag directories 18, 19 may be used. Each snoop tag directory 18, 19 covers a different range of memory addresses. The snoop address determines which of snoop tag directory 18, 19 the request is routed to over snoop bus 16. See the co-pending application for "Duplicate Snoop Tags Partitioned Across Multiple Processor/Cache Chips in a Multi-Processor System", U.S. Ser. No. 10/711,387, filed Sep. 15, 2004.

Although dividing snoop tags and processing over several snoop tag directories 18, 19 reduces snoop processing load on any one snoop tag directory 18, 19, most of the tasks for snoop processing is still performed by snoop tag directory 18, 19. Snoop tag directory 18, 19 must order requests from different caches into the correct sequence, and must ensure that other caches invalidate lines or forward dirty data to the new cache before the new cache can operate on the requested cache line. Bottlenecks can occur as requests, messages and acknowledgements from the many caches funnel to snoop tag directory 18 or snoop tag directory 19.

What is desired is a multi-processor, multi-cache system with distributed cache coherency processing.

BRIEF DESCRIPTION OF THE DRAWINGS

FIG. 1 shows three caches using a snoop bus for coherency.

FIG. 2 shows a distributed snoop directory.

FIG. 6A shows an entry in a filter pipe.

FIG. 6B shows a coherency queue for storing coherency entries for pending invalidation and interventions to sharer and owner filter pipes.

DETAILED DESCRIPTION

The present invention relates to an improvement in cache coherency. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
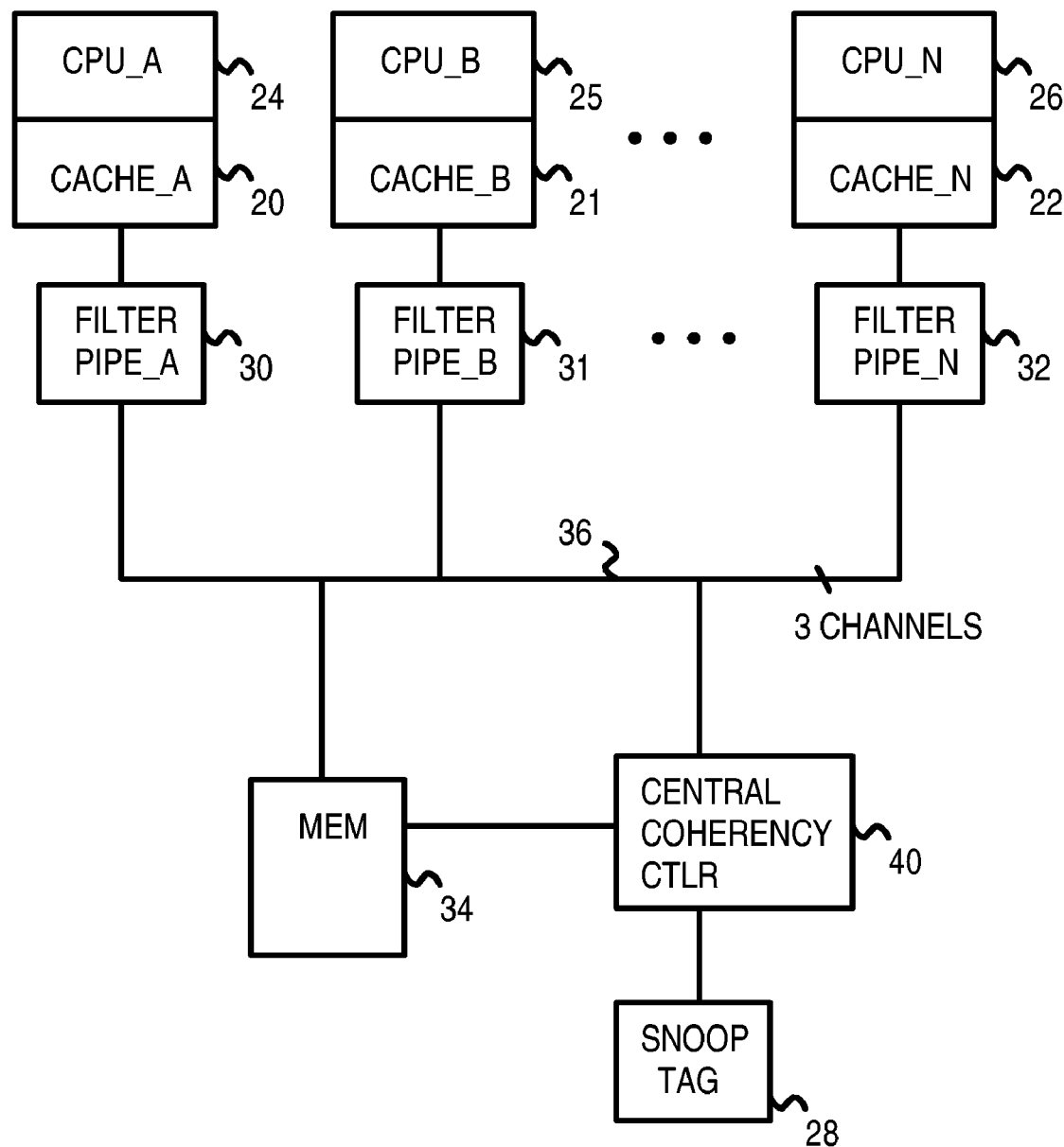
FIG. 3 is a diagram of a multi-processor system with distributed coherency processing at requestor filter pipes and at a central snoop controller.

FIG. 3 is a diagram of a multi-processor system with distributed coherency processing at requester filter pipes and at a central snoop controller. Central processing unit (CPU) processor 24 temporarily stores instructions and data in cache 20, while second processor 25 temporarily stores its instructions and data in cache 21. There may be up to N processors and caches in a system. Last processor 26 uses cache 22. Data is eventually written back to main memory 34, which also supplies new instructions and data for processing to caches 20, 21, 22.

Each memory line in main memory 34 that is temporarily present as a cache line in one of caches 20, 21, 22 has a snoop entry in snoop tag directory 28. Each snoop entry indicates which of caches 20, 21, 22 has a copy of the cache line, and possibly other information such as whether the line might have been written (dirty). Caches 20, 21, 22 store a tag portion of the address along with the data as cache lines. Cache lines may have a different size than memory lines in main memory 34.

Snoop tag directory 28 is a central location to track the locations of copies of all cache lines in the system. However, rather than have all coherency processing at snoop tag directory 28, coherency processing is distributed. Some coherency processing, such as looking up a snoop address in snoop tag directory 28, is performed centrally by central coherency controller 40. Other coherency processing, such as forwarding data from one cache to another, and tracking invalidations by other caches, is performed by caches 20, 21, 22, and by filter pipes 30, 31, 32.

Filter pipes 30, 31, 32 track snoop requests made by a local cache. For example, filter pipe 30 tracks snoop requests from cache 20, while second filter pipe 31 tracks snoop requests from second cache 21 and Nth filter pipe 32 tracks snoop requests from Nth cache 22.

When a cache line is present in more than one of caches 20, 21, 22, then the requesting cache's filter pipe tracks invalidations and interventions in the other caches. For example, a read miss in first cache 20 causes a snoop request to be sent to central coherency controller 40. An entry in filter pipe 30 tracks this request.

If the snoop-requested cache line is also present in second cache 21, central coherency controller 40 sends an invalidation or intervention to filter pipe 31. The cache line in second cache 21 is invalidated, and the cache-line data is forwarded to first filter pipe 30 if modified. Second cache 21 sends an acknowledgement message to first filter pipe 30 acknowledging that the cache line has been invalidated in second cache 21. When the cache-line data is forwarded, no invalidate acknowledgement is sent.

The acknowledgement message by-passes central coherency controller 40. Instead, the acknowledgement message is sent directly from second cache 21 to first filter pipe 30. Once the data has been received, either from main memory 34 or from second cache 21, and all acknowledgement messages from other caches and the ordering message from central coherency controller 40 have been received by filter pipe 30, then filter pipe 30 allows the new cache-line data in first cache 20 to be used by first processor 24.

Since the acknowledgement messages by-pass central coherency controller 40, message bandwidth at central coherency controller 40 is reduced. The processing load of central coherency controller 40 is also reduced, since some coherency processing, such as tracking invalidations is performed by filter pipes 30, 31, 32.

As more processors and caches share main memory 34, bandwidth or processing bottlenecks do not form at central coherency controller 40, since message-passing and coherency processing are distributed to caches 20, 21, 22, and filter pipes 30, 31, 32. Thus a scalable yet coherent architecture is achievable.

Filter pipes 30, 31, 32 and central coherency controller 40 are connected together by snoop buses 36. Snoop buses 36 are divided or partitioned into 3 channels. These channels include a first (request) channel for sending requests from a requesting cache 20, 21, 22 to central coherency controller 40, a second (coherency) channel for sending ordering messages, invalidations, and interventions from central coherency controller 40 to filter pipes 30, 31, 32, and a third (reply) channel for sending data and acknowledgement messages from caches 20, 21, 22 to filter pipes 30, 31, 32 and for sending data from main memory 34 to filter pipes 30, 31, 32. These channels can have separate physical buses or can share one or more physical buses and be logical channels.

Figure 4:
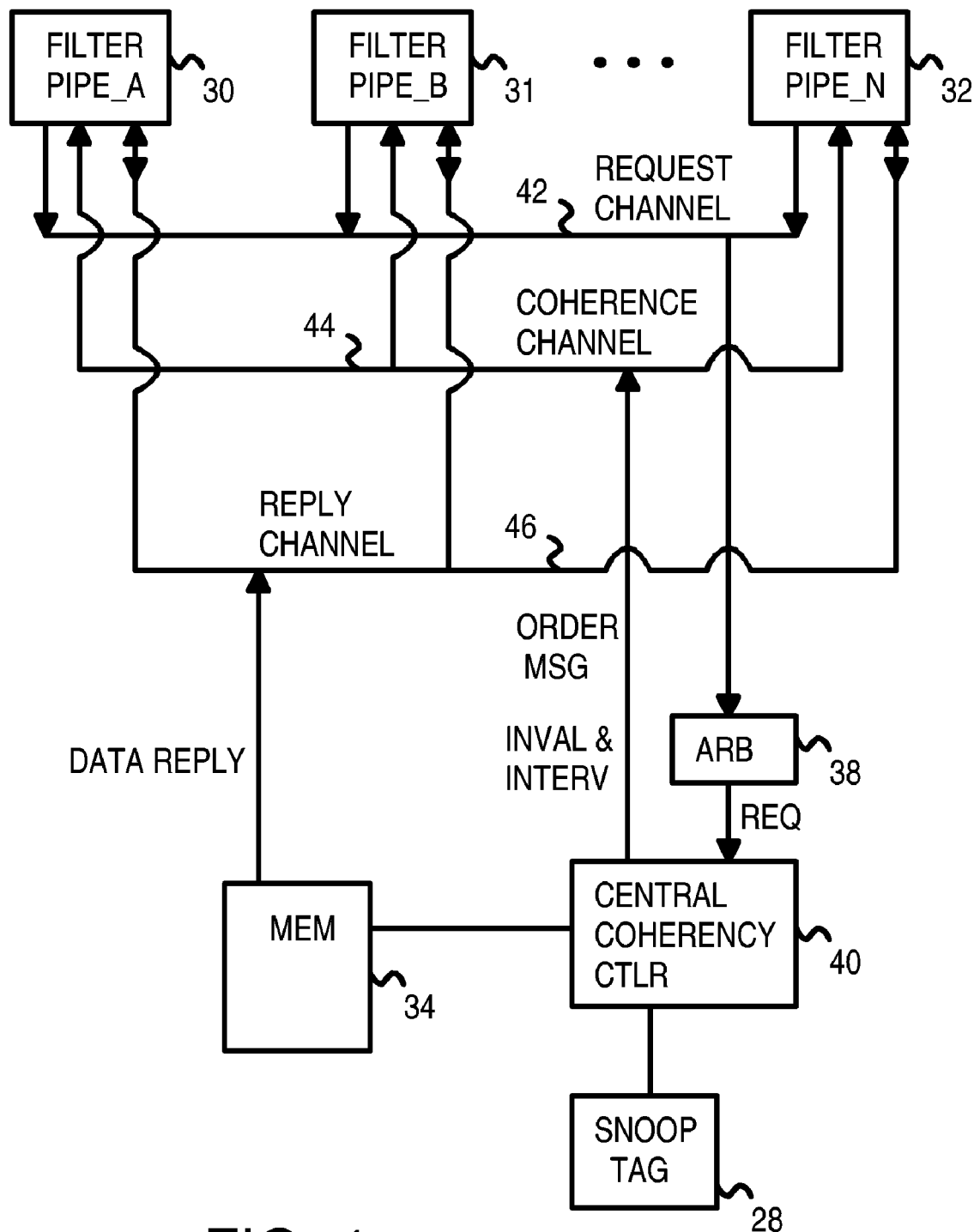
FIG. 4 shows three channels between filter pipes and the central coherency controller in more detail.

FIG. 4 shows three channels between filter pipes and the central coherency controller in more detail. The snoop buses between filter pipes 30, 31, 32 at the processor caches and snoop tag directory 28 at central coherency controller 40 are divided into three channels. Request channel 42 carries snoop requests from caches 20, 21, 22 to central coherency controller 40. Arbiter 38 arbitrates among requests from caches 20, 21, 22, choosing one request at a time for input to central coherency controller 40 for processing. Round-robin, priority, or other kinds of arbitration may be used.

Central coherency controller 40 processes the request by looking up the snoop address from the request in snoop tag directory 28. If a match is found, another cache has a copy of the requested line. An intervention is needed if the cache line may have been modified by the other cache. The intervention causes the owning cache to forward the data to the requesting cache. If the request is a write request, invalidations are needed for all caches which are sharers of the requested cache line. When no match in snoop tag directory 28 is found, no other cache has a copy of the requested cache line. No invalidations or interventions are needed. A new entry for the requested cache line is loaded into snoop tag directory 28.

Coherence channel 44 carries ordering messages from central coherency controller 40 to a requesting one of filter pipes 30, 31, 32. Ordering messages instruct the requesting filter pipe as to the order for processing fills relative to interventions and invalidations sent on behalf of other caches. Ordering messages also contain information on the number of other caches that must acknowledge invalidation of copies of the cache line to the requesting filter pipe if the request was a write request.

Invalidations and interventions are also carried on coherence channel 44 to filter pipes 30, 31, 32 that are not the requesting filter pipe. Invalidations are sent to filter pipes 30, 31, 32 for non-owner caches that contain a copy of the requested cache line, when the requesting cache intends to modify the cache line. Since these caches do not own the cache line, the cache line can simply be invalidated.

Interventions are sent to one of filter pipes 30, 31, 32 for a cache that is the owner of the requested cache line. The owner of the cache line has the most current data, and may be more current that the data in main memory 34. Thus the intervention is needed to instruct the other cache owning the cache line to send the data directly to the requesting cache. The cache line is invalidated in the other cache after being sent to the requesting cache if the request was a write request. The data is sent from the owning cache to the requesting cache over reply channel 46.

Ordering messages, invalidations, and interventions are three different types of coherency messages that are carried over coherence channel 44.

Reply channel 46 is also used to send data from main memory 34 to the requesting filter pipe when no other cache is the owner of that cache line. One or more invalidations but no interventions may also occur in this situation. Other kinds of operations may not require that any data be sent to the requestor. A cache-zero operation that clears the cache line is an example of an operation that does not need a data reply.

Figure 5A:
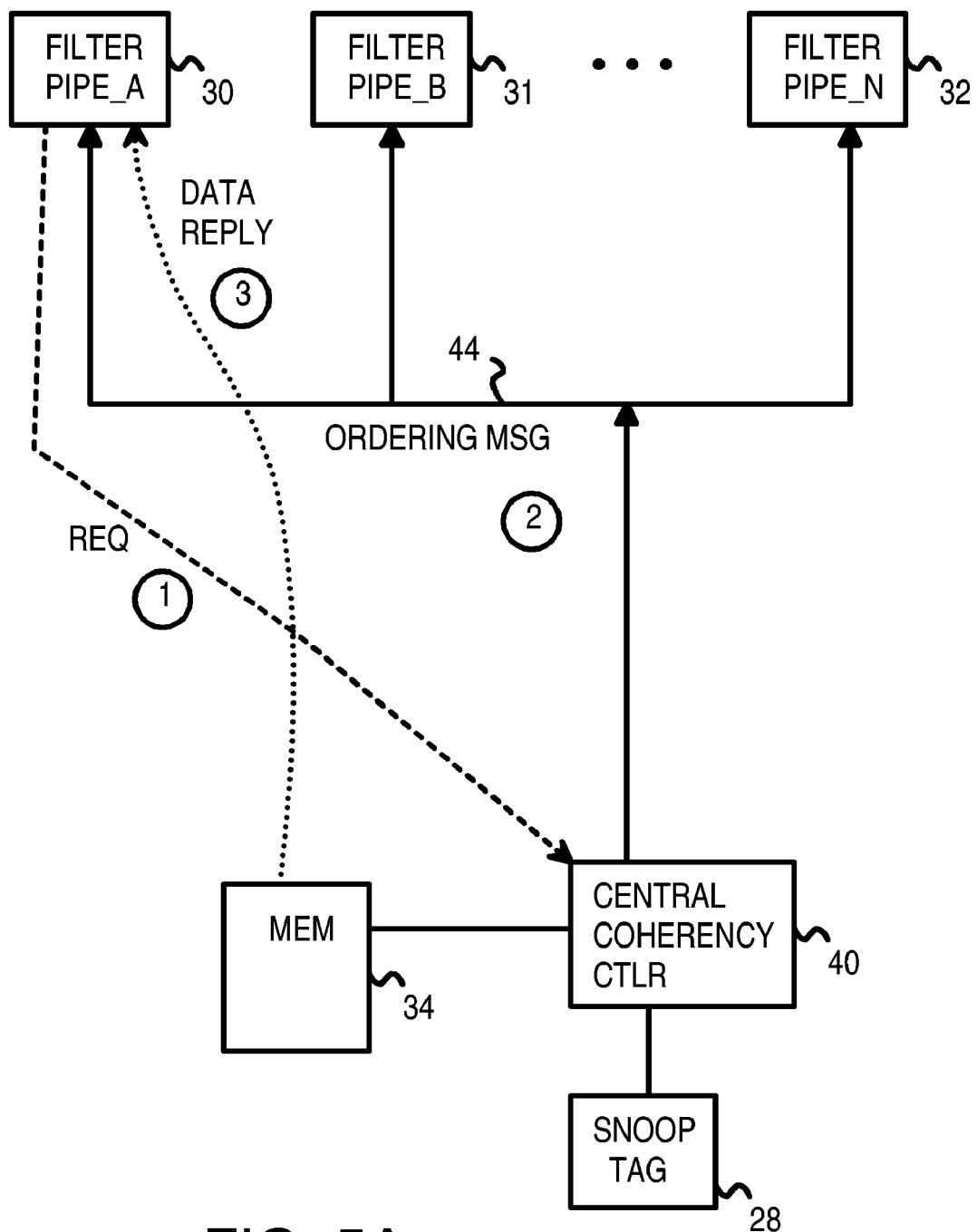
FIGS. 5A-B highlight messages and distributed coherency processing for a cache miss to an unshared and to a shared line.
Figure 5B:
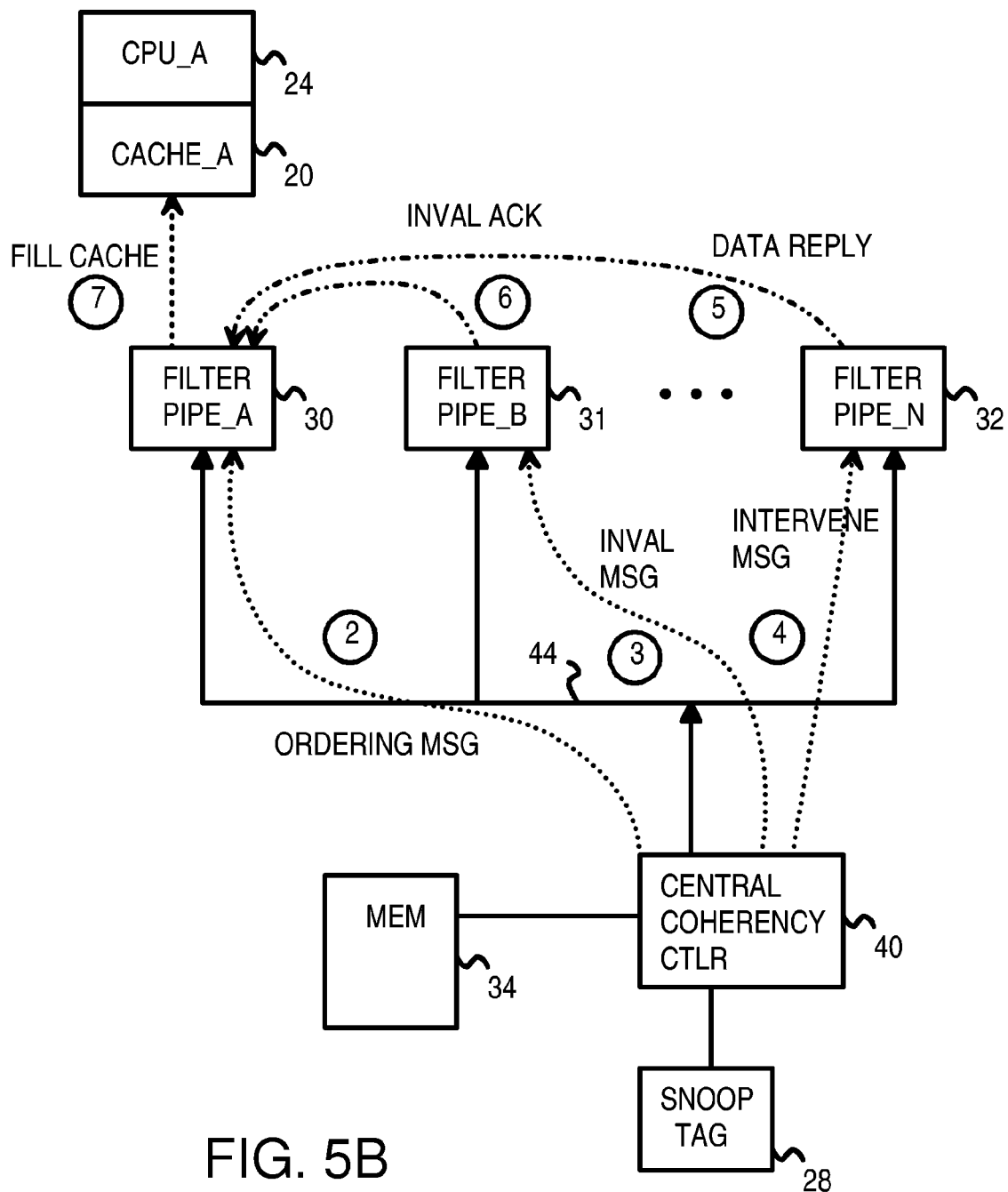

FIGS. 5A-B highlight messages and distributed coherency processing for a cache miss to an unshared and to a shared line. In FIG. 5A, a cache miss occurs, causing an entry to be loaded into first filter pipe 30. The address of the new cache line is the snoop address loaded into the entry in first filter pipe 30. A request that includes this snoop address is sent from first filter pipe 30 to central coherency controller 40 over the request channel.

Central coherency controller 40 arbitrates among incoming requests from many filter pipes for many caches, and determines the correct order or sequence that the requests should be processed. There may be various ordering and coherency rules that are followed by central coherency controller 40 when ordering requests.

Once central coherency controller 40 has determined the order for processing requests, ordering messages are generated to send back to each requesting filter pipe. In this example, an ordering message is sent from central coherency controller 40 over coherence channel 44 to first filter pipe 30.

Central coherency controller 40 looks up the snoop address from the request in snoop tag directory 28 and determines which caches have a copy of that requested cache line. When no other cache has a copy of the requested cache line, the data for the cache line can be read from main memory 34 and sent to first filter pipe 30 as a data reply. The data reply is sent over the reply channel.

Each of channels 42, 44, 46 may have different delays, and filter pipes 30, 31, 32 may each have differing latencies before messages are processed. Sometimes the data reply may arrive before the ordering message. First filter pipe 30 then buffers the data from the data reply until the ordering message is received. The processor is not allowed to use the data from the data reply until the ordering message is also received and the coherency operation can complete. While the data may be physically written into a cache, the data is not validated for use by the processor until all messages are received and the filter pipe completes the coherency operation.

In FIG. 5B, the request from first filter pipe 30 has been sent to central coherency controller 40 as described for FIG. 5A. However, unlike the example of FIG. 5A, central coherency controller 40 determines that the requested cache line is shared by other caches in this example of FIG. 5B. Caches for second filter pipe 31 and Nth filter pipe 32 also have a copy of the requested cache line.

An ordering message is generated by central coherency controller 40 and sent back to first filter pipe 30 on coherence channel 44. Central coherency controller 40 carefully considers operations to this same cache line by other requesters, such as by filter pipes 31, 32, when determining the sequence of ordering messages sent back to filter pipes 30, 31, 32. Coherency rules, if any, must be followed.

Several other caches can share the cache line as sharer caches. When another cache is the "owner" of the cache line, the data is sent from the owning cache to requesting filter pipe 30 over reply channel 46, rather than from main memory 34, which may have a stale copy of the data. In this example, second filter pipe 31 is a sharer while Nth filter pipe 32 is the owner of the requested cache line.

Requesting filter pipe 30 may request the cache line for read-only operations, such as when the requested cache line contains instructions or read-only data that is not written by the processor. The copy in second filter pipe 31 does not have to be invalidated in this example.

An intervention is generated by central coherency controller 40 and sent back to owning filter pipe 32 on coherence channel 44. Owning filter pipe 32 then reads the requested data from its cache and sends the cache-line data as a data reply over reply channel 46 to requesting filter pipe 30.

When requesting filter pipe 30 requests the ability to write to the requested cache line, the cache line is invalidated in other caches. Invalidation messages are generate by central coherency controller 40 for each sharer cache that has a copy of the requested cache line, as indicated by a lookup of snoop tag directory 28. Invalidation messages are sent over coherence channel 44 to filter pipes 31, 32 of each cache having a copy of the requested cache line. In this example, an invalidation message is sent from central coherency controller 40 to second filter pipe 31 over coherence channel 44. Second filter pipe 31 responds by invalidating the cache line and sending an invalidation acknowledgement message over reply channel 46 to requesting filter pipe 30.

An intervention is generated by central coherency controller 40 and sent to owning filter pipe 32 on coherence channel 44. Owning filter pipe 32 then reads the requested data from its cache and sends the cache-line data as a data reply over reply channel 46 to requesting filter pipe 30. The cache line in the third cache is invalidated by third filter pipe 32.

The number of other caches with a copy of the requested cache line, and thus the number of caches that must acknowledge invalidating the cache line, is contained in the ordering message sent back to requesting filter pipe 30. As each cache invalidates its copy of the requested cache line, it generates an invalidate acknowledgement that is sent over reply channel 46 to requesting filter pipe 30. Requesting filter pipe 30 decrements a counter for each invalidate acknowledgement received, until the number of acknowledgement messages received matches the number of caches that must acknowledge invalidating the cache line contained in the ordering message from central coherency controller 40.

Once the ordering message and the required number of invalidate acknowledgement messages have been received, along with data from the owning cache, requesting filter pipe 30 can complete the coherency operation. The cache-line fill can be completed. Data can safely be written to cache 20 and processor 24 can operate on this data or read any instructions in the requested cache line. The entry can be removed from filter pipe 30.

Requesting filter pipe 30 waits until all required messages have been received. This includes the ordering message from central coherency controller 40, one or more invalidate acknowledgement messages from sharer caches, and a data reply from the owning cache when data is read. These messages can arrive in any order relative to one another.

FIG. 6A shows an entry in a filter pipe. Entry 50 is an entry in one of filter pipes 30, 31, 32 (FIG. 4). Valid bit 54 is a valid bit that indicates when entry 50 is valid. Once the coherency operation requested by entry 50 has completes, valid bit 54 can be cleared.

The address of the cache miss, writeback, or other cache operation is contained in request-address field 56. This is the snoop address sent to central coherency controller 40 in the request message. Way field 58 contains an indicator of the cache Way for a multi-way cache, such as for an 8-way set-associative cache that can store a data item in any of the 8 ways. Request-type field 60 indicates the type of request (read miss, request to modify, read-only request, request to zero, and evict and may contain multiple sub-fields.

Fields 54, 56, 58, 60 are loaded by the local cache or processor when entry 50 is first loaded into the filter pipe. Other fields 62-70 in entry 50 are initialized to default or zero values or are ignored.

The request message sent to central coherency controller 40 includes an identifier that uniquely identifies the filter pipe generating the request and containing entry 50, the snoop address from request-address field 56, and the request type from request-type field 60. Central coherency controller 40 looks up the snoop address in snoop tag directory 28 and determines if any other caches contain the requested cache line. Central coherency controller 40 also examines the request type, such as whether the request is to modify the data or only to read the data.

Figure 6C:
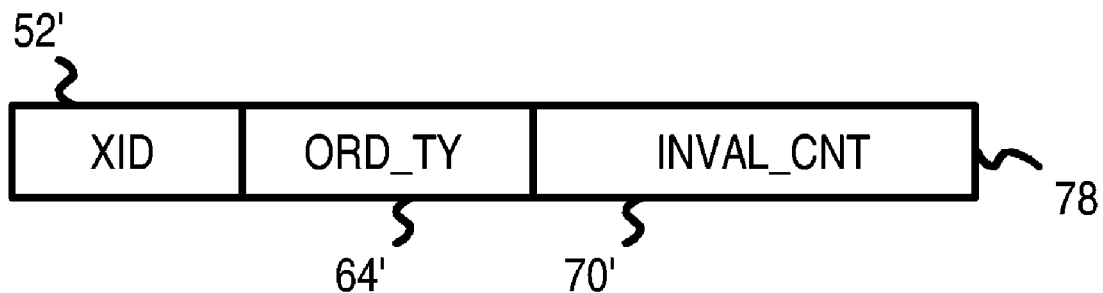
FIG. 6C shows an ordering message from the central coherency controller.

Central coherency controller 40 ultimately responds to the request by sending an ordering message back to the requesting filter pipe. FIG. 6C shows an ordering message from the central coherency controller. Identifier field 52' contains the same identifier sent in the request message. This allows the filter pipes to match incoming messages to entries in their filter pipes. The kind of ordering message is indicated by ordering type field 64'. Some ordering types are—COCSO—shared/owned data from cache, CoDE—exclusive data from DRAM, CoDS—shared data from DRAM, COCM—modified data from cache, CODM—modified data from DRAM, CoUpM—upgrade to modified, CoEvict—cacheline eviction.

When looking up a requested cache line in snoop tag directory 28, central coherency controller 40 determines how many other caches have a copy of the requested cache line. This number of other caches (sharers) is sent in ordering message 78 as invalidate count 70' if the request seeks to modify the line.

When the requesting filter pipe receives ordering message 78 from central coherency controller 40, XID identifier 52 from ordering message 78 is used to index the requesting filter pipe to find an entry 50. The ordering type from ordering type field 64' of ordering message 78 is entered into ordering type field 64 of entry 50, while invalidate count 70' from ordering message 78 is added to invalidate count 70 of entry 50. Ordering-message-received flag 62 is set in entry 50 to indicate that the ordering message has been received from central coherency controller 40.

Sometimes data is read from main memory 34. Then a data reply is sent from main memory 34 to the requesting filter pipe over reply channel 46. When this data reply message is received, data reply-received flag 66 is set in entry 50 and the data is buffered. The type of reply received is indicated by reply-type filed 68. Reply types can include—RpDataC—clean data reply, RpDataCErr—clean data reply with data error, RpDataD—dirty data reply, RpDataDErr—dirty data reply with data error.

Thus fields 62-70 are obtained from central coherency controller 40. Fields 62, 64, 70 are obtained from ordering message 78 from central coherency controller 40, while fields 66, 68 are obtained from reply messages.

Reply messages can also be received from other caches. When another cache owns data that is being requested, central coherency controller 40 sends an intervention to that cache's filter pipe. The owned data may be stale in main memory 34. The intervention message instructs the cache owning the data to forward the data directly to the requesting cache. In this situation, the reply message originates with the owning cache, and fields 66, 68 are set in response to a reply message from the owning cache rather from main memory. The owning cache determines the reply type, such as Dirty/Clean, Error/No Error.

Sometimes several caches have copies of the requested data. These other caches have not modified the data, so they are sharing caches. One cache may be an owning cache while other caches are sharing caches, or all may be sharing caches.

Snoop tag directory 28 has ownership and sharing fields that indicate which caches currently contain copies of the cache line's data, and which cache (if any) has modified the data or owns the data. When looking up the snoop address, central coherency controller 40 also reads these ownership and sharing fields to determine which caches are shares and which is an owner.

If the request is a request to modify the data, each sharing cache is sent an invalidate message over coherence channel 44. An owning cache is sent an intervention message over coherence channel 44. The total number of sharing caches is sent to the requesting cache as invalidate count 70' in ordering message 78.

If the request is a request to only read and not to modify the data, other caches can continue to share the data. Invalidate messages do not have to be sent over coherence channel 44. An owning cache is sent an intervention message over coherence channel 44 to forward data to the requesting cache. Ownership is passed here. This improves the scalability of the system as it limits the number of interventions a filter pipe can receive for each cache line. The owning cache does not invalidate its copy of the data. Invalidate count 70' in ordering message 78 then is 0, since no invalidates are needed. Each filter pipe may represent a sharer or owner cache that can receive invalidate and intervention messages from central coherency controller 40.

FIG. 6B shows a coherency queue that is part of filter pipe entry 50 and is used to store invalidations and interventions that are for the outstanding request. Since all coherency messages for an address are processed in order, interventions and invalidates are only stored in this queue if they are for this address. The filter pipe determines this by examining the index and way (the tag isn't required since only one outstanding request can be present for each index and way at a time) and the ordering message. If the index and way match, but the ordering message has not yet been received, the intervention or invalidate is actually for the old contents of that index and way, not the one for the outstanding request.

As a result, it should be sent to the cache immediately. If the index and way match, and the ordering message has been received, the intervention or invalidate is for the cache-line being tracked by this filter pipe entry. Since the request has not completed (maybe waiting for data or invalidate acknowledgements) the intervention or invalidate cannot yet be processed. So it is stored in this queue (in order) and is sent to the cache after the fill is completed.

FIG. 6C shows an ordering message format. XID 52' of the original request and command field 64' are stored. The requesting filter pipe keeps track of each incoming invalidation acknowledgement by decrementing invalidate count 70 in entry 50 as each acknowledgement message is received.

Invalidate count field 70' is initially zero. The ordering message increases the count, and invalidate acknowledgements reduce the count. Once the count is zero, and the ordering message has been received, and the data reply (if needed) has been received, the request can be completed.

Figure 6D:
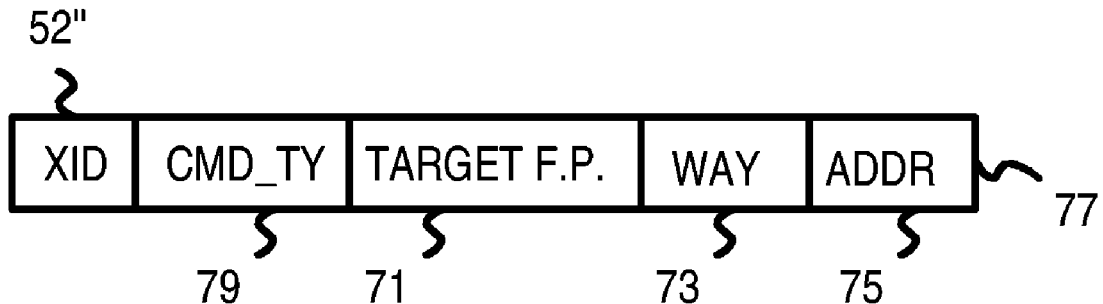
FIG. 6D shows an invalidation or intervention command.

FIG. 6D shows an invalidation or intervention command. Command 77 includes XID 52" of the original request and command type field 79. Interventions and invalidates include target field 71 that identifies the chip and cache that should get the command, and way field 73 for the associative way of the cache and address field 75 for the address.

Figure 7:
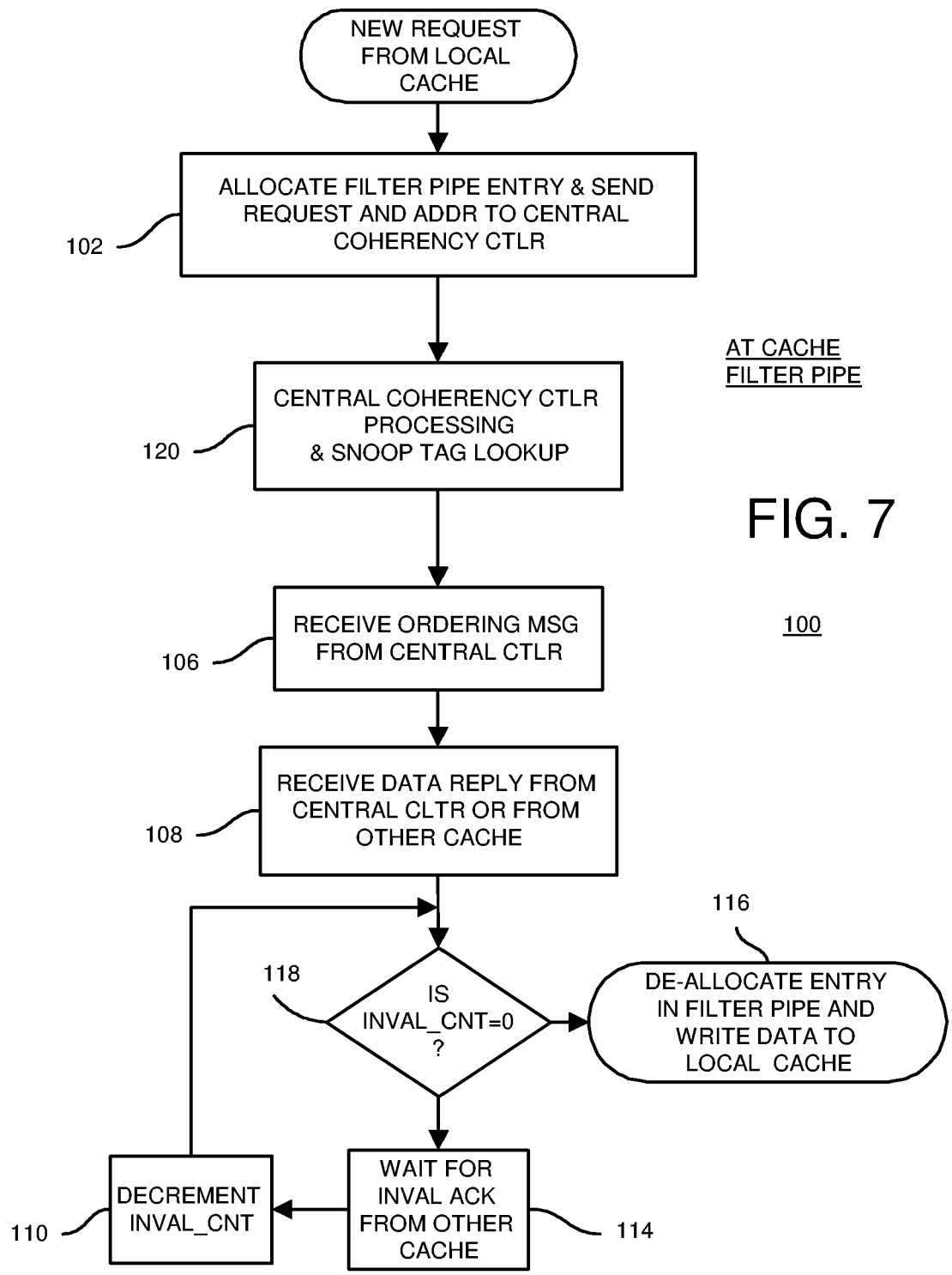
FIG. 7 is a flowchart of coherency operations at a requesting cache's filter pipe.

FIG. 7 is a flowchart of coherency operations at a requesting cache's filter pipe. Filter pipe processing 100 is performed at the requesting filter pipe. When a local cache has a read miss or other event requiring a coherency operation, a new entry in the filter pipe is allocated, step 102. The allocated entry can be formatted such as entry 50 in FIG. 6A. A request message is sent to central coherency controller 40 from the local filter pipe. The request message includes the read-miss address as the snoop address, and an identifier (XID) that identifies the allocated entry in the filter pipe, and the filter pipe or local cache itself. Data may be included in the request message when there is an eviction of modified cache data, a write-back.

Figure 8:
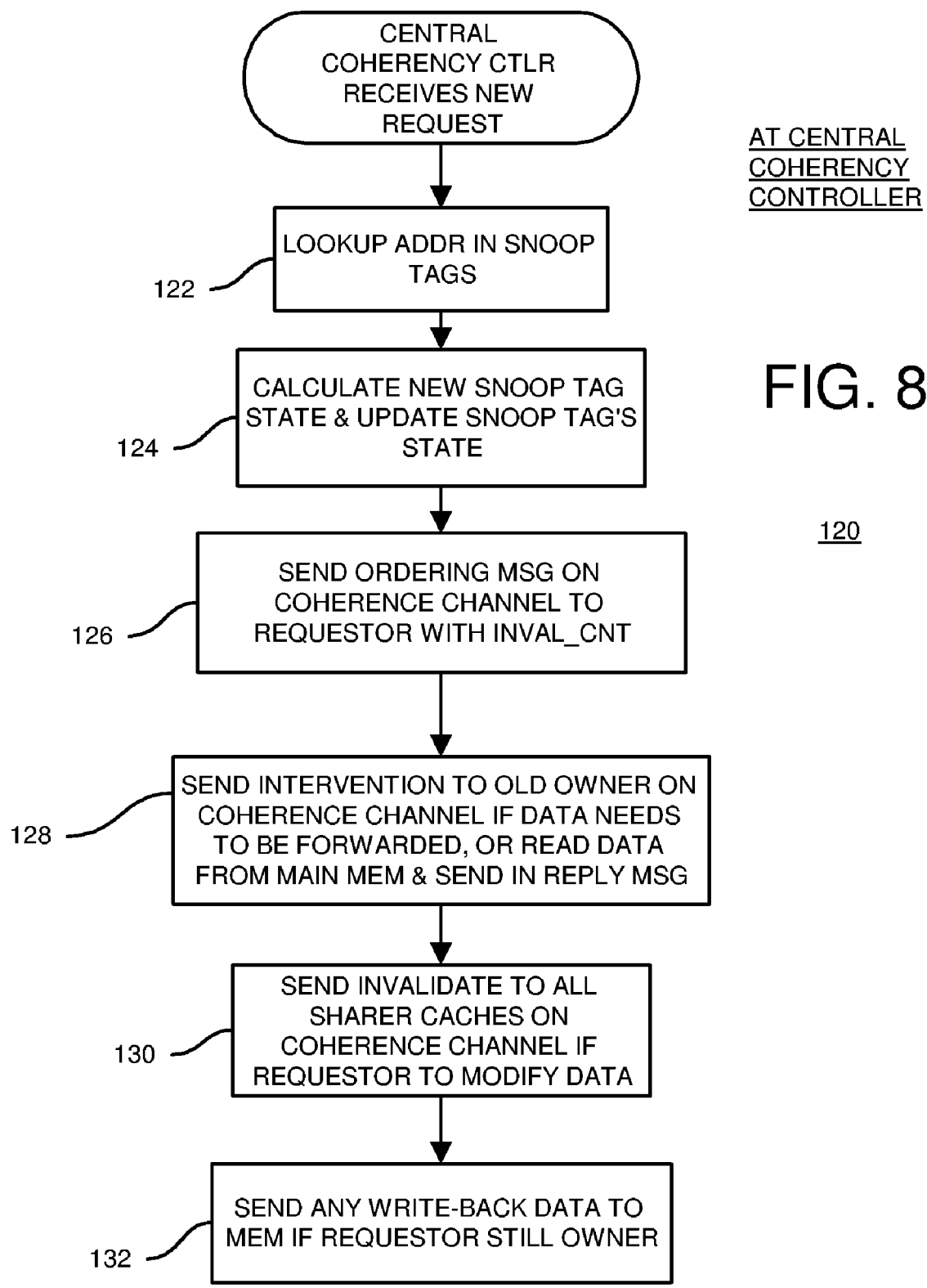
FIG. 8 is a flowchart of coherency operations at the central coherency controller.

The request message is received by central coherency controller 40, which looks up the snoop address in snoop tag directory 28 during central coherency controller process 120 (shown in more detail in FIG. 8). Central coherency controller 40 generates an ordering message that is sent back to the requesting filter pipe, step 106. The requesting filter pipe updates the allocated entry when the ordering message is received, such as by updating invalidate count 70 and setting ordering-message-received flag 62 (FIG. 6A).

The requesting filter pipe eventually may receive a data reply over reply channel 46 from either main memory 34 or from the owning cache's filter pipe, step 108. The reply-received flag 66 in the allocated entry is set, and the reply type entered.

When invalidate count 70 is zero, step 118, then no more acknowledgement messages need to be received. The coherency operation can be completed. The requesting filter pipe can write the reply data to the cache, or otherwise release the cache line for use by the processor, step 116. The entry in the requesting filter pipe can be invalidated or de-allocated once all steps are completed by the requesting filter pipe and its cache.

When invalidate count 70 is not zero, step 118, then more acknowledgement messages need to be received. The coherency operation cannot yet be completed. The requesting filter pipe waits for additional acknowledgement messages to be received, step 114.

When another invalidation acknowledgement is received, invalidate count 70 is decremented for the entry in the filter pipe identified by XID, step 110. Waiting for invalidation acknowledgement messages continues until invalidate count 70 is zero, step 118. Then the coherency operation can be completed, step 116.

While the ordering message has been described as arriving before the data reply, and the data reply has been described as arriving before the invalidation acknowledgement messages, these messages may arrive in any order. For example, steps 106, 108, and 114 may occur in any order. Once all necessary messages have been received, then the coherency operation can be completed, step 116. Since the ordering message and the data reply update flags 62, 66 in entry 50 of the requesting filter pipe, these can be processed at any time, such as when received. Thus the order of steps is more flexible than shown in the flowcharts.

FIG. 8 is a flowchart of coherency operations at the central coherency controller. Central coherency controller process 120 is activated when a request is received over request channel 42. The snoop address from the request message is looked up in snoop tag directory 28, step 122. When the requested cache line is not present in any cache, no matching entry is found and a new snoop entry is created. Otherwise, the matching snoop entry indicates which caches and filter pipes are sharers and which (if any) is the owner.

Figure 10:
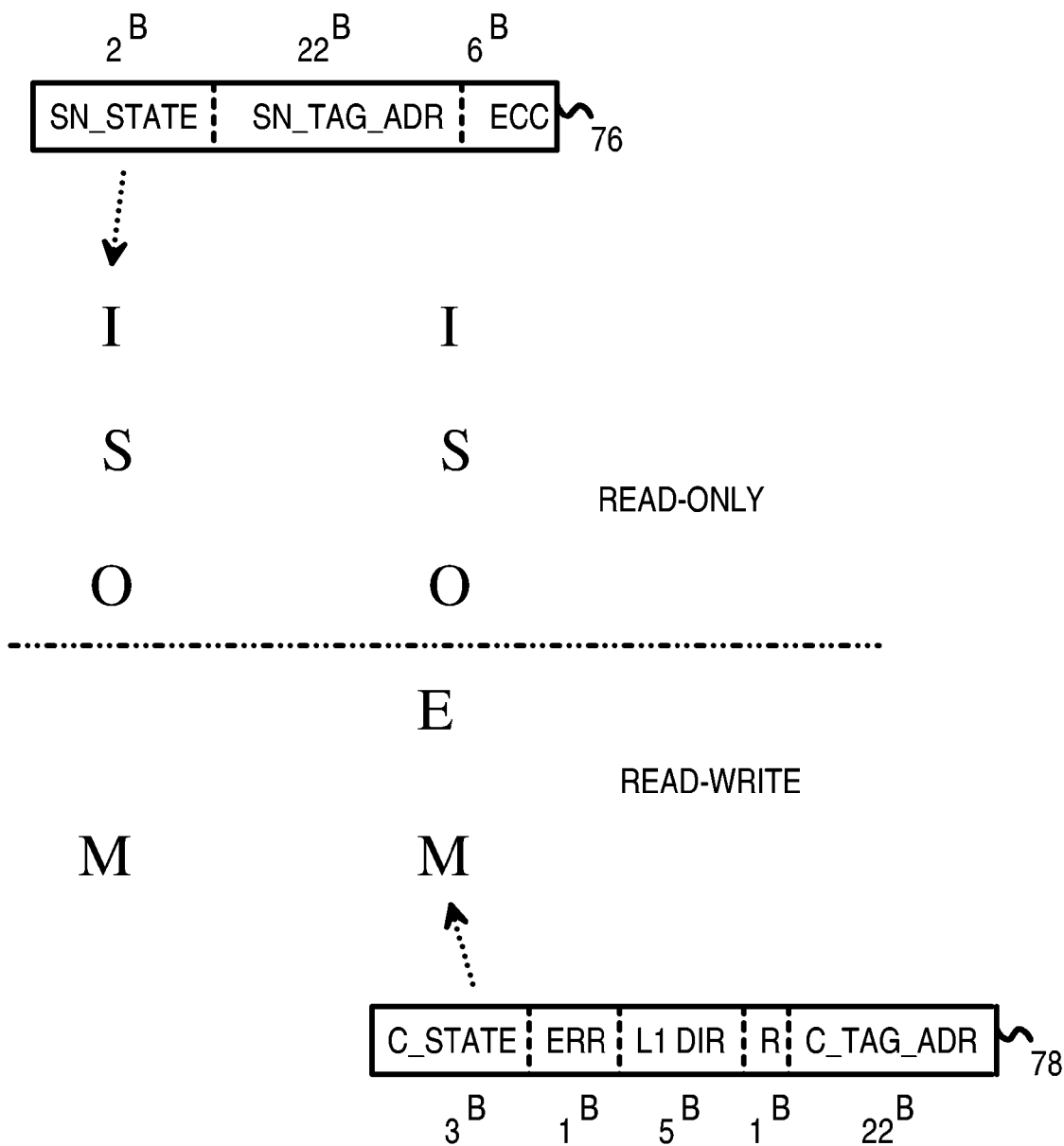
FIG. 10 shows corresponding cache-line states in the local caches and in the snoop tag directories.
Figure 11:
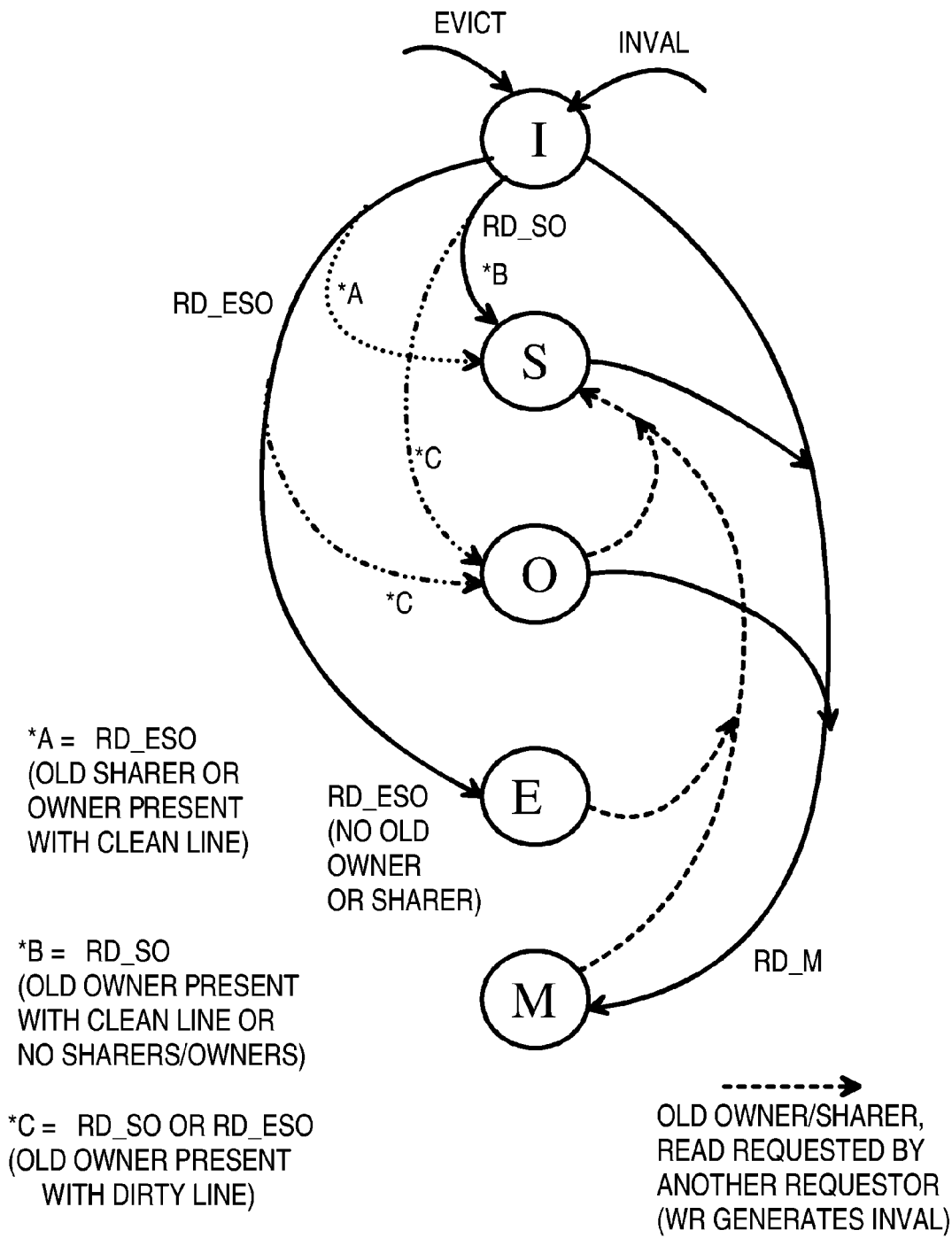
FIG. 11 is a diagram of state transitions for cache lines in a local cache.
Figure 12:
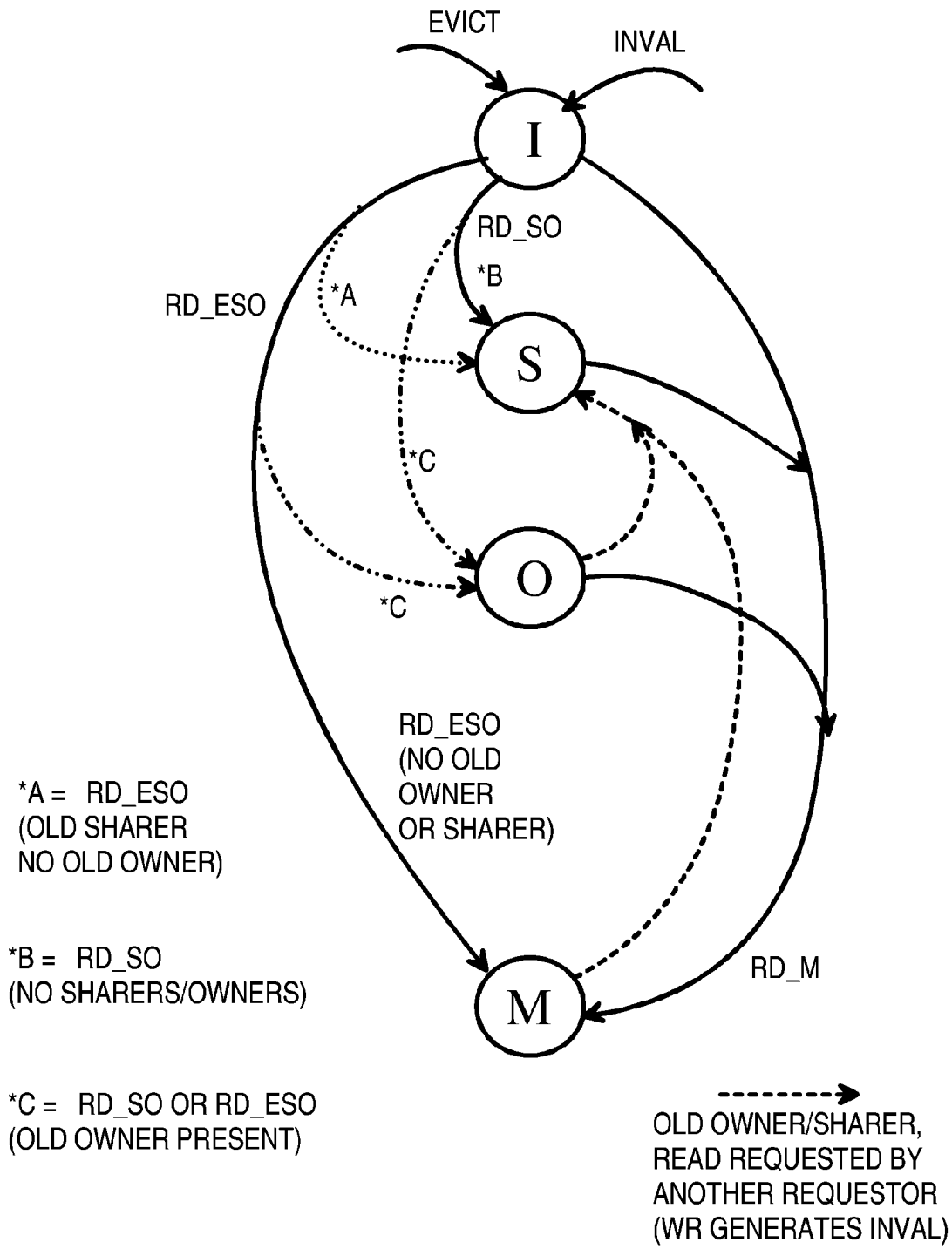
FIG. 12 is a diagram of state transitions within the snoop tag directory for cache lines.

Central coherency controller 40 calculates the new state for the cache line, step 124. The new state may indicate that the requesting filter pipe's cache is a new sharer when the request is a read-only request and there was no existing owner. Alternately, the new state may indicate that the requesting filter pipe's cache is the new owner when the request is a modify or read-write request, and that the previous owner is no longer an owner but only a sharer. Sharers may be invalidated, depending on the state logic implemented. The diagrams of FIGS. 10-12 show an example of state transitions, but other state implementations are possible.

The snoop tags are updated with the newly-calculated states, step 124. The central coherency controller generates and sends out an ordering message over the coherence channel to the requesting filter pipe, step 126. This ordering message contains the invalidate count calculated by the central coherency controller. The invalidate count is the number of sharer cache filter pipes that need to invalidate the requested cache line. This number is determined by examining the snoop tag state fields in snoop tag directory 28 that list which caches share or own the cache line.

When a previous owner is present, an intervention message is generated by central coherency controller 40 and sent over coherence channel 44 to the previous owner cache's filter pipe, step 128. The previous owner is instructed to forward the data to the requesting filter pipe as the data reply message. The previous owner changes its cache line state to sharer, or may invalidate the cache line.

When no previous owner is present, central coherency controller 40 instructs main memory 34 to read the requested data and send a data reply message over reply channel 46 to the requesting filter pipe, step 128. Some kinds of requests may not require data in the reply.

When the requestor filter pipe requests read-write privileges, each sharer filter pipe is sent an invalidation message on coherence channel 44, step 130. In response, each sharer filter pipe invalidates its copy of the requested cache line and sends an invalidate acknowledgement message over reply channel 46 to the requesting filter pipe.

When write-back data is included in the request message, then the write-back data is written to main memory 34 if the requestor is still the owner, step 132. When the requestor is no longer the owner, then the write-back data is discarded.

Figure 9:
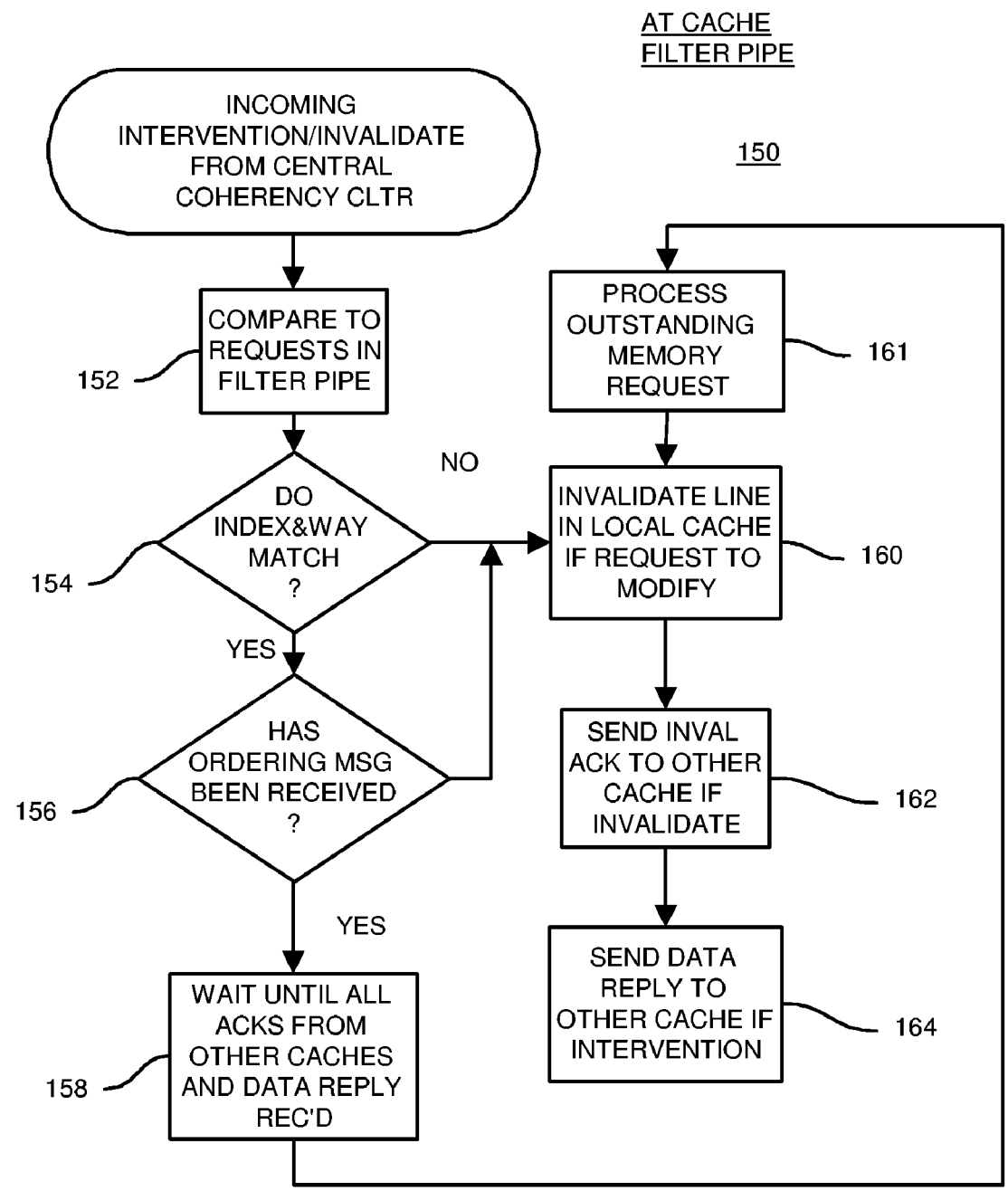
FIG. 9 is a flowchart of coherency operations at a sharing or owning cache's filter pipe.

FIG. 9 is a flowchart of coherency operations at a sharing or owning cache's filter pipe. Invalidation/intervention procedure 150 is activated when a coherency message from central coherency controller 40 on coherence channel 44 is an invalidation and intervention rather than an ordering message. The coherency message's XID identifier is for a different filter pipe and cache.

The snoop address from the coherency message is compared to request addresses for entries in the local filter pipe, step 152. When no entry with a matching index and way is found in the local filter pipe, step 154, the invalidation and intervention can be processed immediately starting with step 160.

When there is a matching entry in the local filter pipe, step 154, and the ordering message for that matching entry in the local filter pipe has not yet been received, step 156, then the central coherency controller has determined that this invalidation/intervention should be processed before the entry's request. The invalidation/intervention is processed immediately, ahead of the matching entry's request, starting with step 160.

When there is a matching entry in the local filter pipe, step 154, and the ordering message for that matching entry in the local filter pipe has already been received, step 156, then this new invalidation/intervention must be processed after the matching entry's request is completed. The incoming invalidation/intervention is delayed until the local request completes. Coherency processing for the incoming invalidation/intervention waits, step 158, until all invalidation acknowledgement messages and the data reply for the matching entry's request are received. Then the invalidation/intervention is processed, after the outstanding memory request is processed, step 161.

The incoming invalidation/intervention is processed, step 160. An invalidation acknowledgement message is generated and sent to the requesting filter pipe, step 162. When the incoming invalidation/intervention is an intervention, the local cache's data is sent to the requesting filter pipe using a data reply message sent over reply channel 46, step 164.

FIG. 10 shows corresponding cache-line states in the local caches and in the snoop tag directories. Snoop-tag entries can have a 2-bit state of the cache line in the local cache, while local cache entries have a 3-bit cache-line state.

For instruction fetches, memory data is loaded into a local cache in a read-only state such as shared (S) or owner (O). For read/write data accesses such as loads and stores, data from the main memory can be loaded into the cache with a state of modified (M) for stores, or exclusive (E). Old cache lines can be invalidated to the I state.

The exclusive state exists only in the local cache entry, not in the snoop tag entry. The snoop tag state has only two bits, and has only the four states I, S, O, M. In contrast, the local cache has three state bits and has five states I, S, O, E, M. When the local cache is in the exclusive (E) state, the snoop tag is in the modified (M) state. This is pessimistic since the cache line in the exclusive (E) state may be either clean (not yet written by the local CPU) or dirty (written to by a local CPU), while the modified (M) state in the local cache indicates that the cache line is definitely dirty.

The local cache and its filter pipe do not have to report back to the snoop tag directory when the CPU writes to a clean line in the E state. The clean cache line in the exclusive (E) state is changed to the modified (M) state when the CPU writes to the cache line, but reporting to the snoop tag directory is not needed since the snoop tag directory was already in the M state since the E state does not exist in the snoop tag directories. Thus the lack of the E state in the snoop tag directories reduces bandwidth since the snoop tag directories do not have to be notified each time a CPU writes to a clean cache line in the E state.

When a local cache requests a new cache line due to a store from its local CPU, the line is loaded into the local cache in the M state. This is a read-modified (RD_M) request.

When the local cache requests a new cache line due to a load (program reading data) from its local CPU, the line is loaded into the local cache in the E, S, or O states. This is a read-exclusive-shared-owned (RD_ESO) request.

When the local cache requests a new cache line due to an instruction fetch from its local CPU, the line is loaded into the local cache in the S, or O states. This is a read-shared-owned (RD_SO) request.

FIG. 11 is a diagram of state transitions for cache lines in a local cache. A cache line can be evicted when it is the least-recently-used of the entries in the selected set, or during a cache flush or other operation. A cache line is invalidated when another local cache has a CPU writing to that cache line. The invalid (I) state is the initial or reset state.

The modified (M) state is entered from any other state when the local CPU requests writing to the cache line. This is known as a read-modify RD_M operation. All other copies of that cache line in other local caches are invalidated so that the cache line in the M state is the only copy of the line. The data in main memory becomes stale after a write and must eventually be updated by a write-back of the dirty cache line to memory.

For read-only data or instruction fetches, a RD_SO operation is performed. The cache line is installed as a shared (S) line when no other cache owns the line. When another cache owns the line, the previous owner is changed to the shared (S) state while the requestor is changed to the owner (O) state if the line was dirty, or the shared state if the line was still clean.

For cache lines installed for read/write data, the RD_ESO operation can be performed. When there are no old sharers or owner of the cache line, the requestor enters the exclusive (E) state. When a previous owner has written to the (dirty) line, the dirty line is copied to the requestor's cache and installed in the owner state. The previous owner is downgraded to the sharer state. When the owner had not yet written to the line (clean), the requestor installs the line in the shared state. Also when only sharers but no owners are present, the shared state is entered by the requestor.

FIG. 12 is a diagram of state transitions within the snoop tag directory for cache lines. Since snoop tag entries have only 2 state bits, a maximum of 4 states are possible. The exclusive (E) state is not present in the snoop tag directory. Instead, when the local cache line is in the exclusive (E) state, the snoop tag directory is in the modified (M) state.

The RD_ESO request causes the local cache to enter the E state when no other local cache has a copy of the line. The snoop tag entry for this line is placed in the M state.

Another difference with FIG. 11 is that the state of the previous owner's cache line, dirty or clean, is not considered by the snoop tag directory. Instead, if an previous owner is present, the requestor's snoop entry enters the O state regardless of whether the line was dirty or clean. For a clean line, the requestor's new state in the local cache (FIG. 11) is shared (S) while the new state in the snoop tag entry is owner (O). The snoop tag directory is more pessimistic in this instance. This can occur for both RD_SO and RD_ESO requests when the previous owner has a clean line. Otherwise, state transitions are similar in FIGS. 11, 12.

ALTERNATE EMBODIMENTS

Several other embodiments are contemplated by the inventors. For example many variations in cache and snoop tag arrangements are possible. The memory controller, central coherency controller, and snoop tags can be on different chips from the processor and its caches or on the same chip. Different address widths are possible, and some address bits may be implied, such as when data is aligned to 4-byte or other boundaries. The number of bits for different address portions (tag, offset, index, etc.) can be varied in many ways. Addresses may be snoop addresses, cache addresses, main-memory addresses, or other addresses or some combination and may have portions of another address or be altered during operations. Addresses may be carried by various buses and may not fit into a precise category of addresses since the address may be generated by the cache and sent to the snoop tags or vice-versa. Rather than store and send full addresses, partial addresses or portions of addresses may be stored in address fields or sent in messages. The filter pipes and caches could be merged, or some of the processing done by one could be done by the other.

Interconnect buses and channels could be a mesh of point-to-point buses, or could have shared buses, switches, or other topologies. Buses to sockets for unpopulated cache/processor cluster chips could be present on a motherboard but not used until the additional cluster chips are installed.

The memory for the cache data, cache tags, and snoop tags may be arranged in a variety of ways, such as having separate memory blocks or using a shared memory block. Special associative memories such as content-addressable memories (CAM) may be used for tags for faster searching for a tag match, or each tag may be read and compared in a more conventional memory.

The local caches may be level-2 caches, or could be level-3 caches or level-1 caches or some combination of caches of different levels, depending on the processor cache architecture. Local caches could be shared among two or more processors, and the number and arrangement of processors, caches, snoop tag directories, and memory controllers could be changed. Snoop tags may or may not be tightly coupled with a memory controller. A pool of memory controllers could be used by the snoop tag directories. Various arbitration or priority schemes could be added.

Other cache coherency schemes could be used having fewer or more states. For example, the modified and owned states could be merged into one state in some embodiments. Different kinds of requests and operations could be defined or supported. Some kinds of operations may not require that any data be sent to the requestor. A cache-zero operation that clears the cache line is an example of an operation that does not need a data reply.

While entry 50 (FIG. 6A) has been described as storing the entire XID, identifier 52, some of the XID may be an identifier for the cache, processor, or filter pipe and may not have to be stored with each entry in the filter pipe. The XID bits for the cache, processor, or filter pipe could be generated for the request message and stripped off the ordering message.

In some cases the previous owner cache's filter pipe may be considered to be a sharer and may follow the sharer's invalidation procedures. Many alternatives are possible.

Rather than have a single central snoop controller and a single snoop tag store, multiple snoop controllers and snoop tag directories may be used. One or more address bits can indicate which snoop controller to route requests to. Thus snoop requests are distributed among several snoop controllers using address bits. See for example the co-pending application for "Duplicate Snoop Tags Partitioned Across Multiple Processor/Cache Chips in a Multi-Processor System", U.S. Ser. No. 10/711,387, filed Sep. 15, 2004.

Various levels and stages of pipelining and buffering may be used. Messages can be delayed by buffers and other events and operations. Processors may be pipelines and may operate with cache-line data before the cache line has been released to the processor by the filter pipe if the processor's use of the cache line can be aborted later. Various speculative execution and operations may be supported.

Controllers for the snoop tags and filter pipes may be implemented in a variety of ways, such as hardware, software, firmware, programmable logic, or combinations. Different fields may be included in entries for snoop tags, filter pipes, coherency entries, cache tags, etc.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A distributed coherency processor comprising:
a plurality of filter pipes for tracking memory requests from a plurality of caches, a requesting filter pipe in the plurality of filter pipes storing a memory-request entry having a request address for a requested cache line;
a central coherency controller that receives memory requests from the plurality of filter pipes, the central coherency controller generating ordering messages and invalidate messages in response to the memory requests;
a snoop tag directory storing snoop entries that indicate sharing caches having a copy of the requested cache line at the request address;
the central coherency controller further for searching the snoop tag directory using the request address from a memory request from a requesting cache, and for sending invalidate messages to sharing filter pipes for the sharing caches identified by the snoop tag directory;
an ordering message sent from the central coherency controller to the requesting filter pipe, the ordering message indicating an order for processing memory requests, the order determined by the central coherency controller;

an invalidate count in the ordering message, the invalidate count indicating a number of the sharing caches in the plurality of caches for the sharing caches identified by the snoop tag directory; and a plurality of invalidate acknowledgement messages, generated by the sharing caches in response to the invalidate messages from the central coherency controller, each of the invalidate acknowledgement messages verifying invalidation of the copy of the requested cache line by the sharing cache;

wherein the requesting filter pipe receives the plurality of invalidate acknowledgement messages and releases data in the requested cache line for processing after a number of the plurality of invalidate acknowledgement messages received by the requesting filter pipe matches the invalidate count from the ordering message, whereby coherency order is determined by the central coherency controller and coherency tracking is performed by the requesting filter pipe in the plurality of filter pipes.

2. The distributed coherency processor of claim 1 wherein the plurality of invalidate acknowledgement messages are sent directly from the sharing caches to the requesting filter pipe and are not sent through the central coherency controller, whereby invalidate acknowledgement messages bypass the central coherency controller and are not processed by the central coherency controller.

3. The distributed coherency processor of claim 2 wherein the memory-request entry stores the request address for the requested cache line and an invalidate counter;

wherein the invalidate counter is loaded with the invalidate count from the ordering message and is adjusted for each invalidate acknowledgement message received from the sharing caches, whereby the invalidate counter tracks the plurality of invalidate acknowledgement messages from the number of the sharing caches.

4. The distributed coherency processor of claim 3 wherein the memory-request entry further stores a request identifier that is included in the memory request, the ordering message, and the plurality of invalidate acknowledgement messages;

wherein the request identifier has different values for requests from different filter pipes in the plurality of filter pipes, and for different memory-request entries in a requesting filter pipe, whereby the request identifier uniquely identifies requests.

5. The distributed coherency processor of claim 2 further comprising:

a coherency channel, coupled between the central coherency controller and the plurality of filter pipes, for carrying the ordering message from the central coherency controller to the requesting filter pipe and for carrying the invalidation messages from the central coherency controller to the sharing filter pipes; and a request channel, coupled between the central coherency controller and the plurality of caches, for carrying the memory requests from requesting caches in the plurality of caches to the central coherency controller.

6. The distributed coherency processor of claim 5 further comprising:

a memory controller for reading the requested cache line from a main memory;

a reply channel coupled between the memory controller and the plurality of filter pipes, for carrying the requested cache line as a data reply to the requesting filter pipe.

7. The distributed coherency processor of claim 6 wherein:

the snoop tag directory also indicates an owning filter pipe for an owning cache that contains a copy of the requested cache line;

the central coherency controller also for sending an intervention message to the owning filter pipe;

the owning filter pipe forwarding the copy of the requested cache line to the requesting filter pipe in response to the intervention message, whereby interventions for owning caches forward data.

8. The distributed coherency processor of claim 7 wherein the intervention message is sent over the coherence channel and a data reply is sent over the reply channel from the owning cache instead of the data reply from the memory controller when the snoop tag directory indicates an owning filter pipe for an owning cache that contains a copy of the requested cache line.

9. The distributed coherency processor of claim 6 wherein the plurality of invalidate acknowledgement messages are sent over the reply channel.

10. The distributed coherency processor of claim 4 further comprising:

a coherency queue having a predetermined size for each memory request entry in a filter pipe in the plurality of filter pipes, the coherency queue having coherency entries that store the request identifier from an invalidate message from the central coherency controller and the request address and an operation field indicating a type of coherence operation to be performed on the requested cache line by the cache, whereby coherency queues store pending coherency operations from the central coherency controller for the sharing filter pipes.

11. The distributed coherency processor of claim 2 further comprising:

a plurality of processors reading data and instructions from the plurality of caches, wherein the distributed coherency processor is within a multi-processor system.

12. The distributed coherency processor of claim 2 wherein the memory request indicates when the requested cache line is a read-only line and when the requested cache line is a read-write line;

wherein the central coherency controller generates the invalidate messages when the requested cache line is read-write and not when the requested cache line is read-only;

whereby modifiable cache lines are invalidated in the sharing caches.

13. A method for distributed coherency processing comprising:

allocating a memory-request tracking entry in a requesting filter pipe that filters coherency operations requested by a local cache;

generating a request message with a request address for a requested cache line for the local cache and sending the request to a central coherency controller;

receiving a plurality of request messages from a plurality of local caches at the central coherency controller and selecting the request message for processing in a coherency-processing order determined by the central coherency controller to preserve coherency according to coherency rules;

searching a snoop tag directory with the request address from the request message to locate a snoop entry for the requested cache line, the snoop entry indicating sharing caches having a copy of the requested cache line;

when the request message is a request for writing the requested cache line, generating invalidation messages and sending the invalidation messages from the central coherency controller to sharing filter pipes for the sharing caches indicated by the snoop tag directory and generating an invalidate count related to a number of the sharing filter pipes;

generating an ordering message that contains the invalidate count and sending the ordering message from the central coherency controller to the requesting filter pipe;

invalidating copies of the requested cache line at sharing filter pipes in response to the sharing filter pipes receiving the invalidation messages from the central coherency controller and generating invalidation acknowledgement messages;

sending the invalidation acknowledgement messages from the sharing filter pipes to the requesting filter pipe, the invalidation acknowledgement messages bypassing the central coherency controller; and releasing the requested cache line for use in the local cache after the requesting filter pipe receives:
(1) the ordering message from the central coherency controller;
(2) a required number of the invalidation acknowledgement messages from the sharing filter pipes, the required number determined by the invalidate count from the ordering message received from the central coherency controller; and
(3) a data reply containing data for the requested cache line when data is requested;

whereby tracking invalidations by sharing caches is performed by filter pipes for local caches rather than being performed by the central coherency controller which orders operations using the ordering messages.

14. The method for distributed coherency processing of claim 13 further comprising:
adjusting a state of a snoop entry to indicate that the requesting cache has a copy of the requested cache line in response to the ordering message being sent,
whereby snoop entry states in the snoop tag directory are adjusted in response to the ordering message before invalidations are performed and tracked by the requesting filter pipe.

15. The method for distributed coherency processing of claim 13 wherein the central coherency controller indicates coherency order using ordering messages sent.

16. The method for distributed coherency processing of claim 13 wherein a snoop entry also indicates an owning cache having a copy of the requested cache line;
further comprising:
generating an intervention message to an owning filter pipe for the owning cache, and sending the intervention message from the central coherency controller to the owning filter pipe for the owning cache indicated by the snoop entry;
invalidating the copy of the requested cache line at the owning filter pipe in response to the owning filter pipe receiving the intervention message from the central coherency controller and generating the data reply message that contains data for the copy of the requested cache line in the owning cache; and
sending the data reply message from the owning filter pipe to the requesting filter pipe, the data reply message bypassing the central coherency controller.

17. The method for distributed coherency processing of claim 16 further comprising:
releasing an invalidation message to invalidate the copy of the requested cache line by a sharing filter pipe when a request address in the invalidation message does not match any request addresses in any memory-request tracking entry in the sharing filter pipe;
releasing the invalidation message to invalidate the copy of the requested cache line by the sharing filter pipe when the request address in the invalidation message matches the request addresses in a matching memory-request tracking entry in the sharing filter pipe and the matching memory-request tracking entry has not yet received an ordering message from the central coherency controller;
delaying the invalidation message to invalidate the copy of the requested cache line by the sharing filter pipe when the request address in the invalidation message matches the request addresses in the matching memory-request tracking entry in the sharing filter pipe and the matching memory-request tracking entry has already received the ordering message from the central coherency controller but has not yet received either:
(1) a required number of the invalidation acknowledgement messages from the sharing filter pipes, the required number determined by the invalidate count from the ordering message received from the central coherency controller; and
(2) a data reply containing data for the requested cache line when data is requested,
whereby invalidation messages are not delayed by the sharing filter pipe before the ordering message is received while invalidation messages after the ordering message is received are delayed by the sharing filter pipe.

18. A cache-coherency system comprising:
coherency controller means for ordering memory requests from a plurality of caches;
a plurality of filter pipe means for storing memory-request tracking entries for memory requests from the plurality of caches;
requesting filter pipe means, in the plurality of filter pipe means, for storing a memory-request tracking entry having a request address for a requested cache line in a requesting cache in the plurality of caches;
request generating means for generating a request message with the request address for the requested cache line for the requesting cache;
request channel means, coupled to the request generating means, for carrying the request message from the requesting filter pipe means to the coherency controller means, the request channel means also for carrying a plurality of request messages from the plurality of filter pipe means for the plurality of caches;
ordering means, in the coherency controller means, for receiving the plurality of request messages from the request channel means, and for selecting the request message for processing in a coherency-processing order determined by the coherency controller means to preserve coherency according to coherency rules;
snoop tag directory means for storing a plurality of snoop entries;

search means for searching the snoop tag directory means with the request address from the request message to locate a snoop entry for the requested cache line, the snoop entry indicating sharing caches in the plurality of caches having a copy of the requested cache line;

invalidation message generation means, activated when the request message is a request for writing the requested cache line, for generating invalidation messages to sharing filter pipes in the plurality of filter pipe means, the sharing filter pipes coupled to sharing caches in the plurality of caches, the sharing caches indicated by the snoop entry;

invalidate count generation means for generating an invalidate count related to a number of the sharing filter pipes;

coherence channel means for carrying the invalidation messages from the coherency controller means to the sharing filter pipes;

ordering message generating means, coupled to the invalidate count generation means and to the ordering means, for generating an ordering message that contains the invalidate count, the ordering message being sent by the coherence channel means from the coherency controller means to the requesting filter pipe means;

sharer invalidation means, in the sharing caches, for invalidating copies of the requested cache line at sharing caches in response to the sharing filter pipes receiving the invalidation messages from the coherency controller means;

sharer message generation means, in the sharing caches, for generating invalidation acknowledgement messages;

reply channel means for carrying the invalidation acknowledgement messages from the sharing caches to the requesting filter pipe means, wherein the invalidation acknowledgement messages bypass the coherency controller means; and release means, in the requesting filter pipe means, for releasing the requested cache line for use in the requesting cache after the requesting filter pipe means receives:

(1) the ordering message from the coherency channel means;

(2) a required number of the invalidation acknowledgement messages from the reply channel means from the sharing caches, the required number determined by the invalidate count from the ordering message; and (3) a data reply from the reply channel means, the data reply containing data for the requested cache line when data is requested;

whereby tracking invalidations by sharing caches is performed by filter pipe means for caches rather than being performed by the coherency controller means which orders operations using the ordering messages.

19. The cache-coherency system of claim 18 wherein the snoop entry also indicates an owning cache having a copy of the requested cache line;

further comprising:

intervention means for generating an intervention message to an owning filter pipe in the plurality of filter pipe means for the owning cache, and for sending the intervention message over the coherency channel means to the owning filter pipe for the owning cache indicated by the snoop entry;

owner invalidation means for invalidating the copy of the requested cache line at the owning cache in response to the owning filter pipe receiving the intervention message from coherence channel means;

data reply means for generating a data reply message that contains data for the copy of the requested cache line in the owning cache; and forwarding means for sending the data reply message over the reply channel means from the owning cache to the requesting filter pipe, the data reply message bypassing the coherency controller means.

20. The cache-coherency system of claim 19 further comprising:

first release means for releasing an invalidation message to invalidate the copy of the requested cache line by a sharing filter pipe when a request address in the invalidation message does not match any request addresses in any memory-request tracking entry in the sharing filter pipe;

second release means for releasing the invalidation message to invalidate the copy of the requested cache line by the sharing filter pipe when the request address in the invalidation message matches the request addresses in a matching memory-request tracking entry in the sharing filter pipe and the matching memory-request tracking entry has not yet received an ordering message from the coherency channel means;

first delay means for delaying the invalidation message to invalidate the copy of the requested cache line by the sharing filter pipe when the request address in the invalidation message matches the request addresses in the matching memory-request tracking entry in the sharing filter pipe and the matching memory-request tracking entry has already received the ordering message from the coherency channel means but has not yet received either:

(1) a required number of the invalidation acknowledgement messages from the sharing filter pipes, the required number determined by the invalidate count from the ordering message received from the coherency channel means; and (2) a data reply containing data for the requested cache line when data is requested, whereby invalidation messages are not delayed by the sharing filter pipe before the ordering message is received while invalidation messages after the ordering message is received are delayed by the sharing filter pipe.

* * * * *